(12) United States Patent
Nordquist

(10) Patent No.: US 9,642,297 B2
(45) Date of Patent: May 9, 2017

(54) IMPLEMENT COUPLING ARRANGEMENT

(75) Inventor: Dennis Nordquist, Jönköping (SE)

(73) Assignee: HUSQVARNA AB, Huskvarna (SE)

(*) Notice: Subject to any disclaimer, the term of this patent is extended or adjusted under 35 U.S.C. 154(b) by 122 days.

(21) Appl. No.: 14/423,561

(22) PCT Filed: Aug. 24, 2012

(86) PCT No.: PCT/EP2012/066538
§ 371 (c)(1),
(2), (4) Date: Feb. 24, 2015

(87) PCT Pub. No.: WO2014/029449
PCT Pub. Date: Feb. 27, 2014

(65) Prior Publication Data
US 2015/0181796 A1    Jul. 2, 2015

(51) Int. Cl.
*A01B 59/06*    (2006.01)
*A01D 34/66*    (2006.01)
(Continued)

(52) U.S. Cl.
CPC ............ *A01B 59/064* (2013.01); *A01D 34/64* (2013.01); *A01D 34/662* (2013.01); *A01D 42/00* (2013.01);
(Continued)

(58) Field of Classification Search
CPC .... A01D 34/661; A01D 34/662; A01D 34/64; A01D 2031/645; A01D 42/00;
(Continued)

(56) References Cited

U.S. PATENT DOCUMENTS 3,252,523 A * 5/1966 Kachnik .............. A01B 51/026
  172/140
3,269,750 A * 8/1966 Tantlinger .......... B62D 53/0864
  188/3 R (Continued)

FOREIGN PATENT DOCUMENTS

DE    20316114 U1    3/2004
EP    1759569 A1    3/2007
(Continued)

OTHER PUBLICATIONS

International Search Report and Written Opinion of PCT/EP2012/066538 mailed on May 14, 2013, all enclosed pages cited.
(Continued)

*Primary Examiner* — Jamie L McGowan
(74) *Attorney, Agent, or Firm* — Nelson Mullins Riley & Scarborough LLP

(57) ABSTRACT

An implement coupling arrangement, typically for use with a lawn care vehicle (1), comprising a first part arranged to be coupled to a vehicle (1) and a second part arranged to be selectively mounted on the first part, in which the first part comprises a support arm (5) configured to support the second part, a mounting (6) for moveably mounting the support arm (5) relative to the vehicle (1), and a biasing member (7) arranged so as to bias the support arm (5) upwards relative to the vehicle (1), in which the second part comprises an implement (9) and a mounting assembly (8), the mounting assembly (8) and the support arm (5) being interengageable so as to mount the second part on the first part; and in which the arrangement further comprises a locking mechanism (10), which has a locked state which inhibits movement of the support arm (5) upwards relative to the vehicle (1) beyond a point, and an unlocked state which allows upward movement of the support arm (5) relative to the vehicle (1) beyond the point; in which
(Continued)

disengagement of the mounting assembly (8) from the support arm (5) causes the locking mechanism (10) to enter the locked state.

20 Claims, 3 Drawing Sheets

(51) Int. Cl.
*A01D 42/04* (2006.01)
*A01D 42/08* (2006.01)
*A01D 42/00* (2006.01)
*A01D 42/06* (2006.01)
*A01D 34/64* (2006.01)

(52) U.S. Cl.
CPC ............ *A01D 42/04* (2013.01); *A01D 42/06* (2013.01); *A01D 42/08* (2013.01); *A01D 2034/645* (2013.01); *Y10T 403/32254* (2015.01)

(58) Field of Classification Search
CPC ........ A01D 42/04; A01D 42/06; A01D 42/08; A01B 51/00; A01B 59/064; B60D 1/36; B60D 1/155; E02F 3/96
See application file for complete search history.

(56) References Cited

U.S. PATENT DOCUMENTS

| | | | |
|---|---|---|---|
| 3,421,780 A * | 1/1969 | Rimmey | B60D 1/02 280/477 |
| 7,451,586 B1 | 11/2008 | Papke et al. | |
| 7,556,279 B2 * | 7/2009 | Suhling | B60D 1/06 280/511 |
| 2007/0074496 A1 | 4/2007 | Sundberg et al. | |

FOREIGN PATENT DOCUMENTS

| | | |
|---|---|---|
| GB | 1429736 A | 3/1976 |
| WO | 2010140932 A1 | 12/2010 |

OTHER PUBLICATIONS

Chapter I of the International Preliminary Report on Patentability issued on Feb. 24, 2015, all enclosed pages cited.

* cited by examiner

IMPLEMENT COUPLING ARRANGEMENT

FIELD

This invention relates to an implement coupling arrangement, a vehicle (typically, but not exclusively, a lawn care vehicle) having such an arrangement, and a set of implements for a vehicle.

BACKGROUND

Ride-on lawnmowers are well known. Some ride-on lawn care vehicles comprise a ride-on vehicle unit having a removable lawn care implement, such as a cutting deck, plough, aerator or so on. Typically, these are mounted on a spring-loaded frame at the front of the vehicle. The spring-loaded frame is pivotally mounted to the vehicle, so that the implement can follow the contours of the ground, and so that the implement can be lifted up into a transport position.

The spring-loading of the frame tends to lift the implement upwards, so as to relieve some of the weight of the implement and to help the user lift the implement into the transport position. However, because the equipment coupling mechanism is biased in this way, when the operator decouples the implement from the vehicle the equipment coupling mechanism can snap upwards and hit hard against the vehicle frame or body. This may damage the vehicle and surprise the operator.

Furthermore, when the operator tries to reattach an implement to the vehicle, the operator has to perform the difficult task of moving the equipment coupling mechanism against the biasing force to a lowered position and holding it at this lowered position while also trying to slide (or otherwise install) the implement onto the coupling mechanism.

SUMMARY

According to a first aspect of the invention, there is provided an implement coupling arrangement, comprising a first part arranged to be coupled to a vehicle and a second part arranged to be selectively mounted on the first part,
  in which the first part comprises a support arm configured to support the second part, a mounting for moveably mounting the support arm relative to the vehicle, and a biasing member arranged so as to bias the support arm upwards relative to the vehicle,
  in which the second part comprises an implement and a mounting assembly, the mounting assembly and the support arm being interengageable so as to mount the second part on the first part;
  and in which the arrangement further comprises a locking mechanism, which has a locked state which inhibits movement of the support arm upwards relative to the vehicle beyond a point, and an unlocked state which allows upward movement of the support arm relative to the vehicle beyond the point;
  in which disengagement of the mounting assembly from the support arm causes the locking mechanism to enter the locked state.

Thus, by having such a locking mechanism, the support arm will not suddenly move when the weight of the implement is removed. Furthermore, the user is less likely to have to move the support arm against the force generated by the biasing member when engaging the mounting assembly with the support arm.

Furthermore, the support arm can be held a consistent distance above the ground. This means that, with the mounting assembly of a given implement suitably positioned, it may be possible to drive the vehicle so that the support arm—held at a known height by the locking mechanism—engages the mounting assembly. This is more difficult if the support arm is not held in the correct position.

Typically, the locking mechanism will be arranged such that engagement of the mounting assembly on the support arm will cause the locking mechanism to enter the unlocked state. Preferably, where the disengagement of the mounting assembly occurs over a range of travel, the locking mechanism will have entered the locked state during the range of travel, and not after; typically, it will be towards the end of the range of travel (say, at least 75% or 90% through the range of travel).

The locking mechanism will typically be mounted on the first part. The locking mechanism may comprise an engaging part, which engages the second part, typically the mounting assembly, when the mounting assembly engages the support arm. The locking mechanism may be arranged such that, when the mounting assembly is disengaged from the support arm, the mounting assembly moves the engaging part, which in turn causes the locking mechanism to enter the locked state. Conversely, the locking mechanism may also be arranged such that, when the mounting assembly is engaged with the support arm, the mounting assembly moves the engaging part, which in turn causes the locking mechanism to enter the unlocked state.

The locking mechanism may comprise a rotating part, with rotation of the rotating part effecting the transfer between the locked and unlocked states. The rotating part may be arranged so that, in the locked state, with the support arm coupled to the vehicle, as the support arm is biased towards the vehicle, the rotating part comes into contact with part of the vehicle, and so prevents motion of the support arm past a point where the rotating part contacts the part of the vehicle. The rotating part may be arranged to engage the part of the vehicle, or may simply abut the part of the vehicle so as to act as a stop.

The engaging part may be coupled to the rotating part so as to drive rotational motion of the rotating part; typically, this will allow the engaging part to function as a push rod. The rotating part may be mounted on the support arm about an axis; the engaging part may engage the rotating part at a point offset from the axis.

Typically, the mounting assembly and the support arm will be interengageable by means of a telescopic mounting. As such, part of the support arm may be receivable within the mounting assembly, or vice versa. This allows for the second part to be simply slid on and off the first part and so simplifies removal or installation and reinstallation of the implement. The locking mechanism proposed above functions particularly conveniently with such an interengagement, as the relative linear motion of the two parts can be converted by the pushrod arrangement into rotational motion of the rotating part.

The biasing member may comprise a spring, such as a tension or compression spring, or resilient or elastic material.

According to a second aspect of the invention, there is provided a vehicle having an implement coupling arrangement according to the first aspect of the invention, where the mounting is mounted on the vehicle.

The vehicle may be provided with a plurality of second parts, in which, with the implement resting on a flat surface, the mounting assembly is a consistent distance above the surface. This allows various different second parts to be mounted on the vehicle, with the support arm held at the correct height to engage them simply by driving the vehicle towards the mounting assembly. Typically, the support arm will also be the consistent distance above the flat surface when the vehicle is driven on that surface. Each of the second parts may have a different implement.

According to a third aspect of the invention, there is provided a set of implements for a vehicle, comprising a plurality of implements, each of the implements being provided with a mounting assembly by means of which they can be removably mounted on a moveable support member of the vehicle, in which when the implements are resting on a flat surface, each of the mounting arms is a consistent distance from the surface, and wherein the consistent distance is substantially the same as a distance between the moveable support member and a flat surface on which the vehicle rests when the moveable support member is locked in response to removal of an implement.

In any of the aspects, the implements will typically be lawn care implements, and could be any of a cutting deck of a lawnmower, a plough, snow thrower, brush, aerator or other equipment, configured to be mounted to the front of the vehicle.

Typically, the vehicle will be a lawn care vehicle, an articulating rider with a front-mounted lawn care implement, a ride-on lawn tractor, a ride-on rear-engine mower or a ride-on zero-turn mower.

BRIEF DESCRIPTION OF THE DRAWINGS

There now follows, by way of example only, description of an embodiment of the invention, described with reference to the accompanying drawings, in which.

DETAILED DESCRIPTION OF EMBODIMENTS

FIGS. 1 to 4 of the accompanying drawings shows a ride-on mower, which comprises a ride-on vehicle unit 1 having an engine 2. The vehicle unit 1 is supported on four wheels 3 (the front left wheel being omitted from FIG. 1 for the sake of clarity). The engine 2, which may, for example, be a petrol-driven internal combustion engine, a battery-driven electric motor, or some combination of combustion engine and electric motor(s), provides power to drive at least one of the wheels 3 via a transmission assembly (not shown). The vehicle unit 1 also includes a seat or other operator station for supporting a seated or standing operator and one or more controls, such as a steering wheel for steering the vehicle, a pedal for actuating a clutch or a braking assembly, and/or other common controls.

In the illustrated embodiment, the vehicle unit 1 is a rear-engine articulating lawn care vehicle that is steered by articulating a rear portion of the vehicle that contains the rear wheels relative to a front portion of the vehicle that contains the front wheels about the vertical axis of a hinge mechanism located between the two portions. In other embodiments, the vehicle unit 1 may have other configurations. For example, the vehicle unit 1 may be, for example, a stand-on or sit-on "zero-turn" lawn care vehicle where the vehicle is supported by two independently driven drive wheels and one or more caster wheels. In another example embodiment, the vehicle unit 1 may be a lawn tractor, where the engine is located forward of the operator and the vehicle is typically steered by the front wheels. In still another example, the vehicle unit 1 is a rear-engine non-articulated rider with front or rear steering.

In the illustrated embodiment, the vehicle unit 1 is configured to support a removable front-mounted implement. The implement may be any powered or non-powered tool used to complete a particular task, such as a lawn care task. For example, the implement may be a cutting deck for mowing grass, a plough, a brush, a blower, a dethatcher, a brush cutter, an aerator, and/or the like. Although the figures provided herein illustrate a front-mounted implement mounted forward of the vehicle unit's front wheels, engine, and operator, other embodiments of the invention may be similarly used on rear, side, or mid-mounted implement assemblies.

Figure 1:
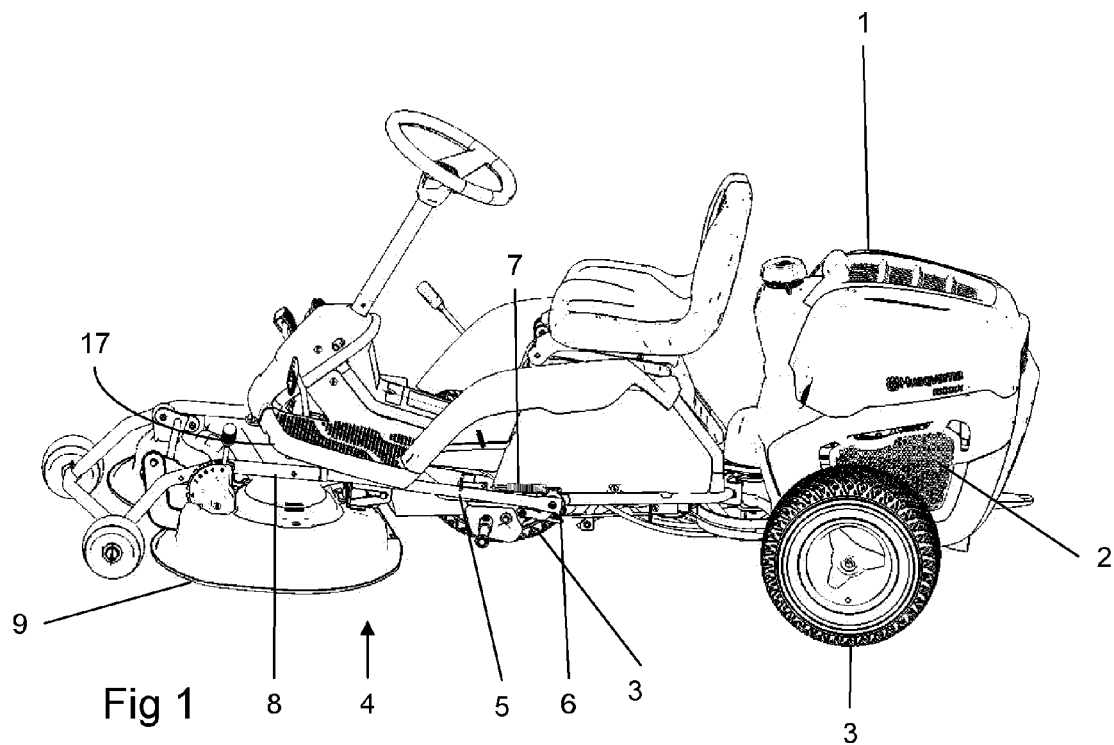
FIG. 1 shows a side view of a ride-on lawnmower in accordance with an embodiment of the present invention.
Figure 2:
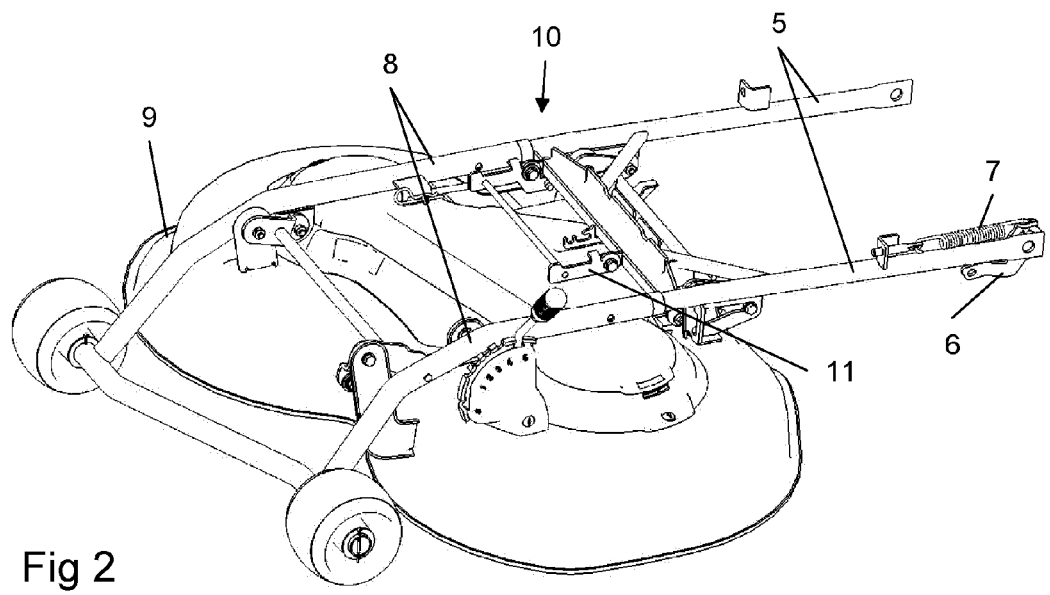
FIG. 2 shows a perspective view of the implement coupling arrangement of the lawnmower of FIG. 1.
Figure 3:
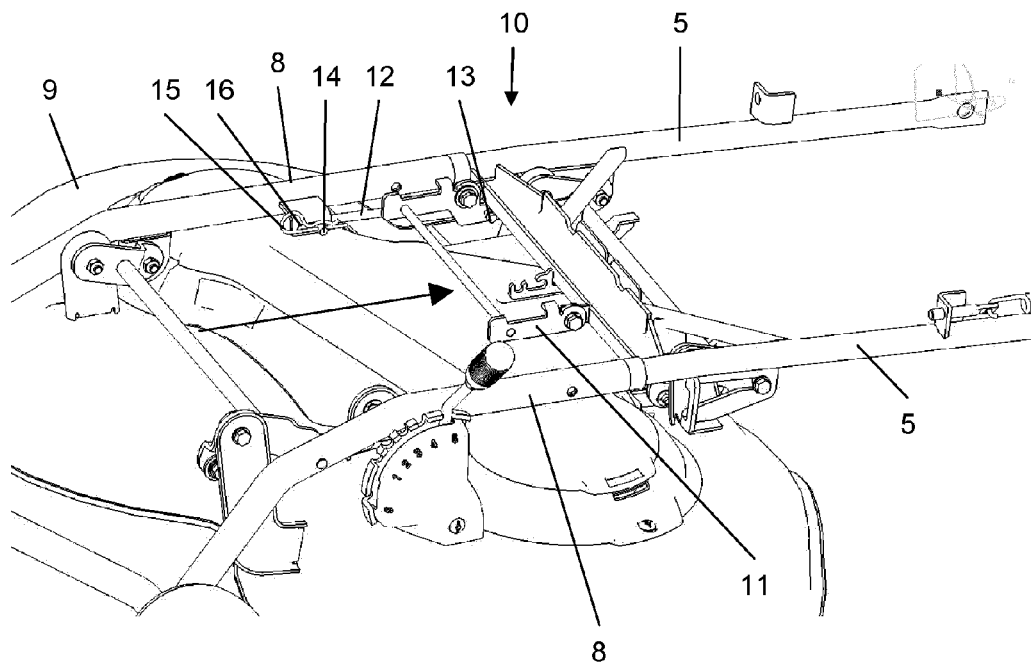
FIG. 3 shows a close-up perspective view of the locking mechanism of the implement coupling arrangement of FIG. 2, in the unlocked state.

Referring to the embodiment shown in FIG. 1, extending from the front of the vehicle unit 1 is an implement mounting arrangement 4. The implement mounting arrangement 4 comprises at least one support member 5 movably coupled to the vehicle unit 1 and configured to support a front-mounted implement 9, here a cutting deck assembly. A mounting 6 couples the support member 5 to the vehicle unit 1 so that the support member can lift the attached implement 9 upwards relative to the vehicle unit 1. The mounting 6 may be a mounting assembly that is separate and distinct from, but capable of being couple to, the vehicle unit 1 and the support member(s) 5 (e.g., a hinge, a bearing, a slide, and/or other coupling mechanism), or the mounting 6 may be integrally formed with the support member 5 and/or the frame or other component of the vehicle unit 1 (e.g., a protrusion, aperture, hook, tongue, groove, and/or other integrally formed feature). A biasing member, such as a spring 7, urges the support member 5 upwards so as to, for example, counteract the downward force generated by the weight of the implement 9 during operation and/or to assist with lifting the implement 9 into a maintenance position.

More particularly, in the illustrated embodiment, the one or more support members comprise a pair of pivoting arms 5 mounted on the mounting 6 fixed to the vehicle unit 1, so that the pivoting arms 5 can pivot about a lateral horizontal axis. The mounting 6 is provided with the spring 7 which acts to bias the pivoting arms upwards towards the underside 17 of the vehicle unit 1.

A mounting assembly coupled to the implement 9 removably mounts the implement 9 to the support member. In the illustrated embodiment, the mounting assembly comprises a mounting arm 8 that is telescopically received on the end of each pivoting arm 5. The mounting arms 8 carry the implement 9. In this case the implement is a cutting deck configured for the mowing of grass. In this regard, the cutting deck comprises a shroud covering two rotary cutting blades; however other cutting deck configurations known in the art may be used. The cutting deck is driven by a transmission system, such as an assembly of belts, pulleys, shafts, gears, clutches, and/or electronics, that transmits power from the engine 2 to the cutting deck to be used to move the blades. In other to perform maintenance on the implement 9 and/or change the combination of the mounting arms 5 and implement 9, the mounting assembly can be detached from the support member by, in this example, sliding the mounting arms 8 off of the pivoting arms 5. In some embodiments, the transmission system that may provide power to some implements 9 must be disconnected in order to slide the mounting arms 8 from the pivoting arms 5 and/or remove the mounting arms 8 and implement 9 from the vehicle unit 1.

In order to make installation or removal of the combination of the mounting arms 5 and the implement 9, a locking mechanism 10 is provided, mounted on support member, here the pivoting arms 8. As explained in more detail below, the locking mechanism 10 has two states: (i) a locked state (shown in FIG. 4 of the accompanying drawings) when it restricts upward motion of the support member relative to the vehicle unit at least beyond a particular point by, in the illustrated embodiment, restricting the pivoting motion of the pivoting arms 5 at least beyond a particular point; and (ii) an unlocked state (shown in FIG. 3 of the accompanying drawings) when the upward motion of the support members (e.g., the pivoting motion of the pivoting arms 5) is permitted beyond the particular point.

In one embodiment, the locking mechanism comprises a rotating member 11 pivotally mounted on the pivoting arms 5 about an axis through and perpendicular to the pivoting arms 5. This can lay in two positions: a first unlocked position shown in FIG. 3 of the accompanying drawings, when it lays flat in a plane containing the generally parallel pivoting arms 5, and a second locked position shown in FIG. 4 of the accompanying drawings, when it protrudes upwards towards the underside 17 of the vehicle unit 1, generally perpendicular to the plane containing the pivoting arms 5.

In the locked position, the rotating member 11 acts as a spacer, preventing the pivoting arms 5 from moving closer than the length l of the rotating member 11 to the underside 17 of the vehicle unit 1. The spring 7 will tend to bias the pivoting arms 5 so that, in the locked position, the rotating member 11 comes into contact with the underside 17 of the vehicle unit 1 (e.g., with a frame/chassis member, body panel, or other vehicle component).

In order to drive the rotating member between the locked an unlocked states, and vice versa, a pushrod 12 is provided. One captive cranked end 13 of this pushrod is pivotally mounted on the rotating member 11, about an axis offset from the axis about which the rotating member 11 is mounted relative to the pivoting arms 5. The other end 14, also cranked but free, of the pushrod, is received within an aperture 16 provided on one of the mounting arms 8, and secured by means of a clip 15. Thus, relative linear movement of the mounting arms 8 and the pivoting arms 5 will cause linear movement of the pushrod 12 relative to the pivoting arm 5, which will, in turn, cause rotational motion of the rotating member 11.

This rotational motion is such that, when the mounting arms 8 are disengaged from the pivoting arms 5 (and so moved in the direction of the arrow in FIG. 4), the rotating member 11 is moved into the locked position. Furthermore, the length of the pushrod 12 is such that the movement into the locked position is completed before the mounting arms 8 are completely disengaged from the pivoting arms 5. Conversely, when the mounting arms 8 are reengaged with the pivoting arms 5 (and so moved in the direction of the arrow in FIG. 3), the rotating member is moved into the unlocked position.

Figure 4:
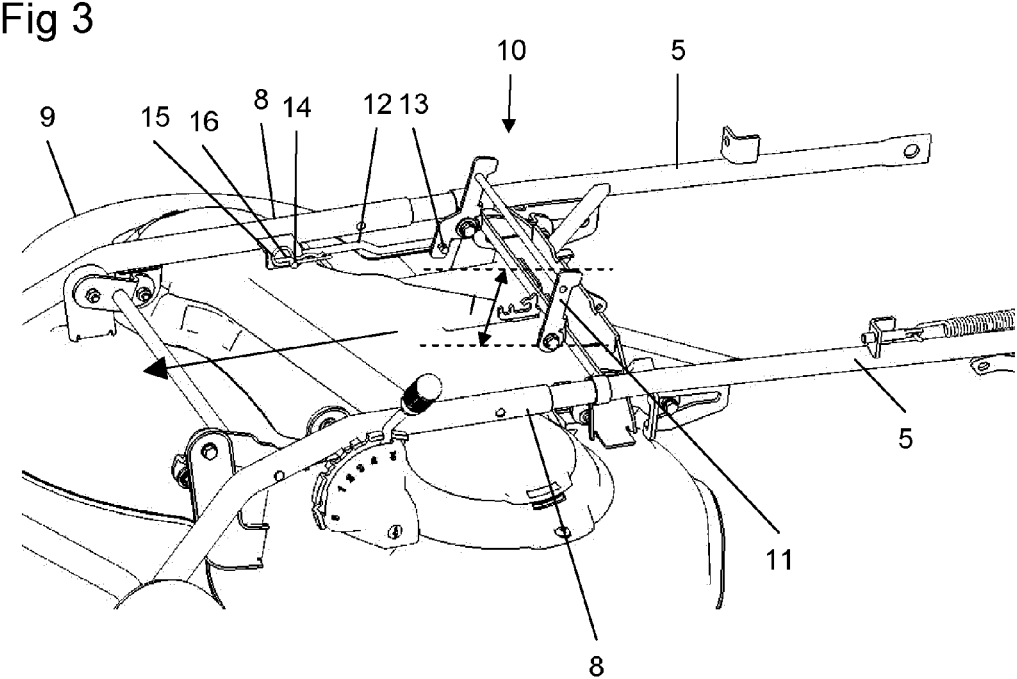
FIG. 4 shows a close-up perspective view of the locking mechanism of FIG. 3, in the locked state.

Thus, when it is desired to remove the implement 9, the mounting arms 8 are slid forwards until the locking mechanism 10 is in the locked position shown in FIG. 4. The pushrod is then removed from the aperture 16, and the combination of the mounting arms 8 and the implement 9 can be lifted off of the pivoting arms 5 without fear of the pivoting arms unpredictably springing upwards and hitting the underside 17 of the vehicle unit 1, as the rotating member 11 is acting to space the pivoting arms 55 from the underside 17 of the vehicle unit 1.

When it is desired to replace the implement 9 (whether it be the same or a different implement), the mounting arms 8 are offered up to the pivoting arms 5, and slid along the pivoting arms 5 until in the position of FIG. 4, when the free cranked end 14 of the pushrod 12 is engaged into the aperture 16. The mounting arms 8 can then be slid to the fully engaged position shown in FIG. 3, which will drive the rotating member 11 back into the unlocked position and allow the full range of pivotal movement of the pivoting arms 5.

Furthermore, once the load of the combination of the mounting arms 8 and the implement 9 have been removed from the pivoting arms 5, the spring 7 will be sufficiently strong to hold the pivoting arms 5 in the position with the locking member contacting the underside 17 of the vehicle unit 1. This means that the pivoting arms will be a constant distance 1 from the underside 17 of the vehicle unit 1, and so a constant distance d above the ground (or other flat surface on which it is resting). This is shown schematically in FIG. 5 of the accompanying drawings.

Figure 5:
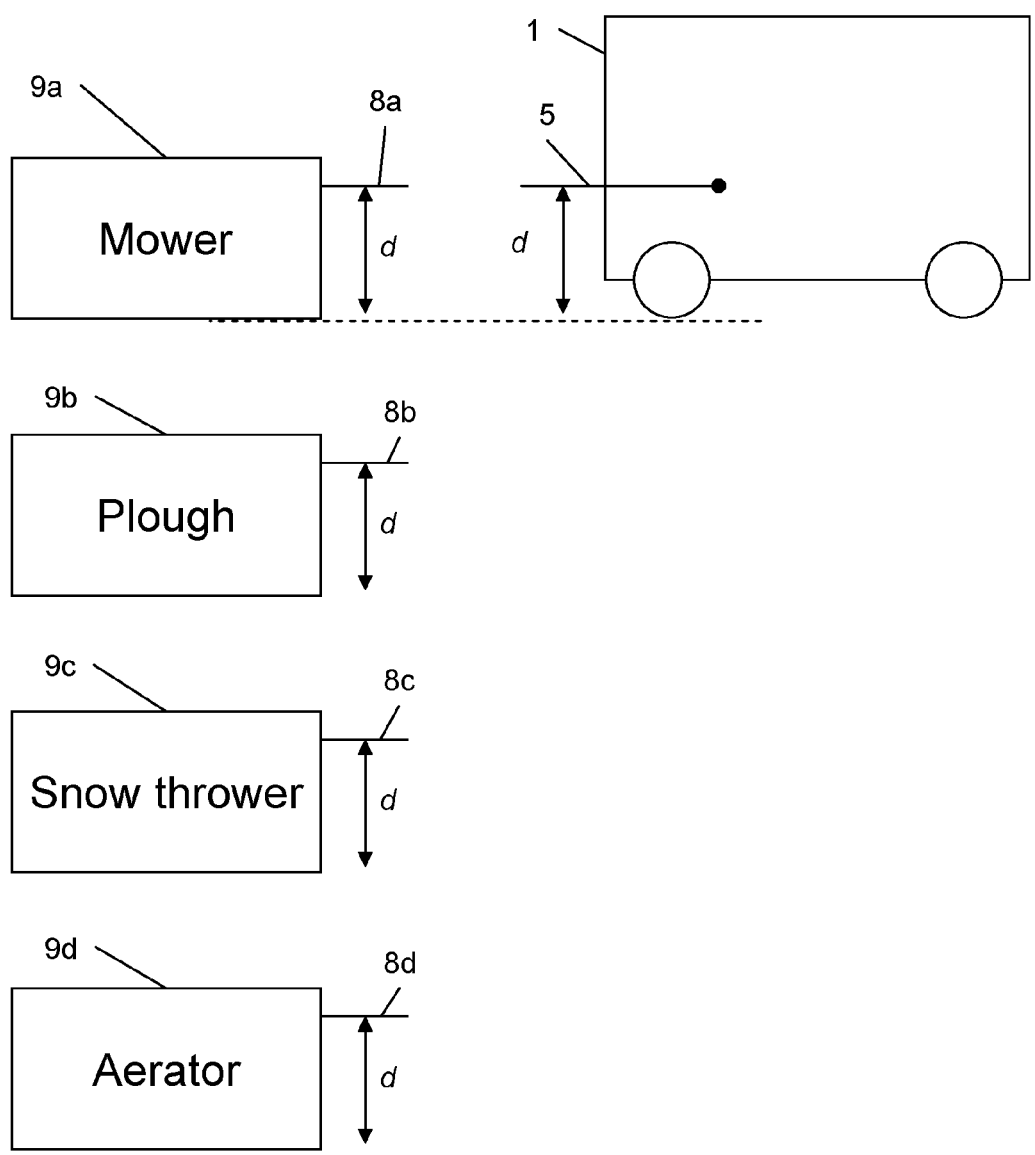
FIG. 5 shows a schematic view of the ride-on lawn care vehicle, such as the example illustrated in FIG. 1, provided with a set of different implements and an embodiment of the implement coupling system.

This constant height above ground d allows for the easy interchange of different implements 9 with their respective mounting arms 8. In FIG. 5, the vehicle unit 1 is provided with four different implements, being a mower 9a, plough 9b, snow thrower 9c and aerator 9d with respective mounting arms 8a, 8b, 8c, 8d.

For each of the implements 9a, 9b, 9c, 9d, the respective mounting arms 8a, 8b, 8c, 8d are also the same distance d above ground. Because, with no implement 9 engaged, the pivoting arms 5 are held at the distance d above ground, all the operator of vehicle unit 1 has to do for the pivoting arms 5 to engage any of the mounting arms 8a, 8b, 8c, 8d is to carefully drive the vehicle unit 1 up to the desired implement 9a, 9b, 9c, 9d, whereupon they will both be at the correct, consistent height to engage correctly. By providing the mounting arms at a consistent height d, a set of implements can be provided that can easily be engaged by the operator of a vehicle unit 1.

Friction washers or another source of friction can be added to the rotating mounting of the rotating member 11 to add some friction to the motion of the rotating member 11. This means that the rotating member 11 will not fall into the unlocked position when engaging or disengaging the mounting arms 8.

The invention claimed is:

1. An implement coupling arrangement, comprising a first part arranged to be coupled to a vehicle and a second part arranged to be selectively mounted on the first part, in which the first part comprises a support arm configured to support the second part, a mounting for moveably mounting the support arm relative to the vehicle, and a biasing member arranged so as to bias the support arm upwards relative to the vehicle, in which the second part comprises an implement and a mounting assembly, the mounting assembly and the support arm being interengageable so as to mount the second part on the first part;

and in which the arrangement further comprises a locking mechanism, which has a locked state which inhibits movement of the support arm upwards relative to the vehicle beyond a point, and an unlocked state which allows upward movement of the support arm relative to the vehicle beyond the point;

in which disengagement of the mounting assembly from the support arm causes the locking mechanism to enter the locked state.

2. The arrangement of claim 1, in which the locking mechanism is arranged such that engagement of the mounting assembly on the support arm causes the locking mechanism to enter the unlocked state.

3. The arrangement of claim 1, arranged such that the disengagement of the mounting assembly occurs over a range of travel and the locking mechanism enters the locked state during the range of travel, and not after.

4. The arrangement of claim 3, in which the locking mechanism enters the locked state at least 75% or 90% through the range of travel.

5. The arrangement of claim 1, in which the mounting assembly and the support arm are interengageable via a telescopic mounting, with part of one of the support arm and the mounting assembly being receivable within the other of the support arm and the mounting assembly.

6. The arrangement of claim 1, in which the locking mechanism is mounted on the first part and comprises an engaging part, which engages the second part when the mounting assembly engages the support arm, the locking mechanism being arranged such that, when the mounting assembly is disengaged from the support arm, the mounting assembly moves the engaging part, which in turn causes the locking mechanism to enter the locked state.

7. The arrangement of claim 6, in which the locking mechanism is arranged such that, when the mounting assembly is engaged with the support arm, the mounting assembly moves the engaging part, which in turn causes the locking mechanism to enter the unlocked state.

8. The arrangement of claim 7, in which the locking mechanism comprises a rotating part, with rotation of the rotating part effecting a transfer between the locked and unlocked states.

9. The arrangement of claim 8, in which the rotating part is arranged so that, in the locked state, with the support arm coupled to the vehicle, as the support arm is biased towards the vehicle, the rotating part comes into contact with part of the vehicle, and so prevents upward motion of the support arm past a point where the rotating part contacts the part of the vehicle.

10. The arrangement of claim 8, in which the engaging part is coupled to the rotating part so as to drive rotational motion of the rotating part.

11. The arrangement of claim 10, in which the rotating part is mounted on the support arm for rotation about an axis, and in which the engaging part comprises a pushrod, having a first cranked end operable to couple with the mounting assembly and a second cranked end coupled to the support arm at a point offset from the axis.

12. The arrangement of claim 1, wherein the implement is a lawn care implement.

13. The arrangement of claim 1, wherein the implement comprises a cutting deck of a lawnmower, a plough, a snow thrower, a brush, or an aerator, and wherein the implement is configured to be mounted to the front of the vehicle.

14. The arrangement of claim 1, wherein the vehicle comprises a lawn care vehicle.

15. A vehicle having an implement coupling arrangement, the implement coupling arrangement comprising:

a first part arranged to be coupled to the vehicle and a second part arranged to be selectively mounted on the first part, in which the first part comprises a support arm configured to support the second part, a mounting for moveably mounting the support arm relative to the vehicle, and a biasing member arranged so as to bias the support arm upwards relative to the vehicle, in which the second part comprises an implement and a mounting assembly, the mounting assembly and the support arm being interengageable so as to mount the second part on the first part;

and in which the arrangement further comprises a locking mechanism, which has a locked state which inhibits movement of the support arm upwards relative to the vehicle beyond a point, and an unlocked state which allows upward movement of the support arm relative to the vehicle beyond the point;

in which disengagement of the mounting assembly from the support arm causes the locking mechanism to enter the locked state.

16. The vehicle of claim 15, provided with a plurality of second parts, in which, with the implement resting on a flat surface, the mounting assembly is a consistent distance above the surface.

17. The vehicle of claim 16, in which the support arm is also the consistent distance above the flat surface when the vehicle is driven on the flat surface.

18. The vehicle of claim 17, wherein the locking mechanism comprises a rotating part, with rotation of the rotating part effecting the transfer between the locked and unlocked states, the rotating part being arranged so that, in the locked state, with the support arm coupled to the vehicle, as the support arm is biased towards the vehicle, the rotating part comes into contact with part of the vehicle, and so prevents upward motion of the support arm past a point where the rotating part contacts the part of the vehicle, in which the consistent distance of the support arm above the flat surface occurs when the rotating part comes into contact with the part of the vehicle.

19. The vehicle of claim 15, in which the vehicle is a lawn care vehicle.

20. The vehicle of claim 15, wherein the vehicle comprises an articulating rider with a front-mounted lawn care implement, a ride-on lawn tractor, a ride-on rear-engine mower, or a ride-on zero-turn mower.

* * * * *